US008906315B2

(12) United States Patent
Brueck et al.

(10) Patent No.: US 8,906,315 B2
(45) Date of Patent: Dec. 9, 2014

(54) DEVICE FOR TREATING EXHAUST GAS CONTAINING SOOT PARTICLES

(71) Applicant: EMITEC Gesellschaft fuer Emissionstechnologie mbH, Lohmar (DE)

(72) Inventors: Rolf Brueck, Bergisch Gladbach (DE); Jan Hodgson, Troisdorf (DE); Christian Vorsmann, Cologne (DE)

(73) Assignee: EMITEC Gesellschaft fuer Emissionstechnologie mbH, Lohmar (DE)

( * ) Notice: Subject to any disclaimer, the term of this patent is extended or adjusted under 35 U.S.C. 154(b) by 0 days.

(21) Appl. No.: 13/833,673

(22) Filed: Mar. 15, 2013

(65) Prior Publication Data

US 2013/0216440 A1 Aug. 22, 2013

Related U.S. Application Data

(63) Continuation of application No. PCT/EP2011/065886, filed on Sep. 13, 2011.

(30) Foreign Application Priority Data

Sep. 15, 2010 (DE) ........................ 10 2010 045 508

(51) Int. Cl.
*B01J 19/08* (2006.01)
*B03C 3/36* (2006.01)

(52) U.S. Cl.
USPC .......................................... 422/186.04; 96/64

(58) Field of Classification Search
USPC .................................... 422/186.04; 96/62, 64
See application file for complete search history.

(56) References Cited

U.S. PATENT DOCUMENTS

| | | | | |
|---|---|---|---|---|
| 4,718,923 | A | 1/1988 | Haag et al. | |
| 5,121,601 | A * | 6/1992 | Kammel | 60/275 |
| 7,198,762 | B1 | 4/2007 | Teboul | |
| 7,354,558 | B2 | 4/2008 | Tsuji | |
| 2005/0063879 | A1 | 3/2005 | Tsuji | |

FOREIGN PATENT DOCUMENTS

| | | | |
|---|---|---|---|
| CN | 2221657 | Y | 3/1996 |
| CN | 1373689 | A | 10/2002 |
| CN | 1601060 | A | 3/2005 |
| DE | 3500373 | A1 | 7/1986 |
| DE | 102004044731 | A1 | 5/2005 |
| DE | 102006057705 | B3 | 3/2008 |
| EP | 0083845 | A1 | 7/1983 |
| EP | 1974822 | A2 | 10/2008 |

(Continued)

*Primary Examiner* — Kishor Mayekar
(74) *Attorney, Agent, or Firm* — Laurence A. Greenberg; Werner H. Stemer; Ralph E. Locher

(57) ABSTRACT

A device for treating exhaust gas containing soot particles includes at least one ionization element for ionizing soot particles, at least one filter element having at least one section to which an electrical potential can be applied, and at least one flow-directing device. The flow-directing device can influence a flow of the exhaust gases in such a way that the soot particles can be prevented from being deposited on at least one electric insulation of the ionization element or of the filter element or can be removed therefrom. Soot particles are therefore effectively prevented from being deposited on electric insulation of exhaust gas cleaning components, thereby preventing short-circuits from being produced and permitting exhaust gas systems to be safely operated.

9 Claims, 3 Drawing Sheets

(56) References Cited

FOREIGN PATENT DOCUMENTS

| | | | | |
|---|---|---|---|---|
| GB | 1022714 | A | | 3/1966 |
| JP | H05269387 | A | | 10/1993 |
| JP | 2005120987 | A | | 5/2005 |
| JP | 2005-232970 | | * | 9/2005 |
| JP | 2006342730 | A | | 12/2006 |
| WO | 8500406 | A1 | | 1/1985 |

* cited by examiner

DEVICE FOR TREATING EXHAUST GAS CONTAINING SOOT PARTICLES

CROSS-REFERENCE TO RELATED APPLICATION

This application is a continuation, under 35 U.S.C. §120, of International Application No. PCT/EP2011/065886, filed Sep. 13, 2011, which designated the United States; this application also claims the priority, under 35 U.S.C. §119, of German Patent Application DE 10 2010 045 508.3, filed Sep. 15, 2010; the prior applications are herewith incorporated by reference in their entirety.

BACKGROUND OF THE INVENTION

Field of the Invention

The present invention relates to a device for treating exhaust gas containing soot particles, in particular with a so-called electrostatic filter or electric filter. The invention is used, in particular, in the treatment of exhaust gases of mobile internal combustion engines in the field of motor vehicles, in particular in the treatment of exhaust gases resulting from diesel fuel.

In motor vehicles with mobile internal combustion engines and, in particular, in motor vehicles with a diesel drive, the exhaust gas of the internal combustion engine usually contains quantities of soot particles which must not be output into the environment. That is predefined by corresponding exhaust gas regulations which predefine the limiting values for the number and the mass of soot particles per weight of exhaust gas or volume of exhaust gas, as well as to a certain extent also for an entire motor vehicle. Soot particles are, in particular, unburnt carbons and hydrocarbons in the exhaust gas.

A multiplicity of different concepts for eliminating soot particles from exhaust gases in mobile internal combustion engines has already been discussed. In addition to wall flow filters which are closed on alternate sides, open secondary flow filters, gravity precipitators, etc., systems have also already been proposed in which the particles in the exhaust gas are electrically charged and then precipitated by using electrostatic attraction forces. Those systems are known, in particular, by the designation “electrostatic filter” or “electric filter.”

In the case of “electric filters,” the provision of an electrical field and/or a plasma brings about an agglomeration of small soot particles to form relatively large soot particles and/or an electrical charge in the case of soot particles. Electrically charged soot particles and/or relatively large soot particles are usually significantly easier to precipitate in a filter system. Soot particle agglomerates are transported more inertially in a stream of exhaust gas due to their relatively large mass inertia and they are therefore deposited more easily at deflection points of a stream of exhaust gas. Electrically charged soot particles are attracted, due to their charge, toward surfaces on which they are deposited and give up their charge. That also facilitates the removal of soot particles from the exhaust gas stream in the field of motor vehicles.

In the case of such electric filters, a plurality of discharge electrodes and collector electrodes positioned in the exhaust gas line are hence generally proposed. In that context, for example, a central discharge electrode which runs approximately centrally through the exhaust gas line and a surrounding lateral surface of the exhaust gas line as a collector electrode are used to form a capacitor. With that configuration of the discharge electrode and of the collector electrode, an electrical field is formed transversely with respect to the direction of flow of the exhaust gas, wherein the discharge electrode can be operated, for example, with a high voltage which is in the region of approximately 15 kV. As a result, in particular corona discharges can form by which the particles flowing with the exhaust gas through the electrical field are charged in a unipolar fashion. Due to that charge, the particles migrate to the collector electrode as a result of the electrostatic Coulomb forces.

In addition to systems in which the exhaust gas line is embodied as a collector electrode, systems are also known in which the collector electrode is embodied, for example, as a wire mesh. In that context, the accumulation of particles on the wire mesh serves the purpose, under certain circumstances, of combining the particles with further particles in order to thereby achieve an agglomeration. The exhaust gas which flows through the mesh then carries the relatively large particles along with it and feeds them to conventional filter systems.

When filter systems are regenerated, it is also known not only to perform intermittent regeneration by brief heating, that is to say burning of the soot (catalytically motivated, oxidative conversion), but also to convert soot by using nitrogen dioxide ($NO_2$). The advantage of the continuous regeneration with nitrogen dioxide is that soot can then already be converted at significantly lower temperatures (in particular less than 250° C.). For that reason, continuous regeneration is preferred in many application cases. However, that leads to the problem that it is necessary to ensure that the nitrogen dioxide in the exhaust gas comes into contact with the accumulated soot particles to a sufficient extent.

In that context too, technical difficulties arise in the implementation of continuous operation of such exhaust gas systems in motor vehicles, wherein the different loads of the internal combustion engines give rise to different exhaust gas streams, compositions of exhaust gas and/or temperatures.

Furthermore, it must be borne in mind that when such components are made available for such a soot precipitation system, as far as possible simple components are to be used, in particular also components which can be manufactured cost-effectively as part of a series production. Furthermore, particularly with respect to the construction of the electrodes, it is necessary to bear in mind that under certain circumstances they have to be positioned so as to be aligned in the exhaust gas line, in particular in such a way that an undesirably high ram pressure or undesired turbulences of the exhaust gas do not occur in the region of the electrode.

Even if the systems described above have heretofore proven, at least in trials, to be suitable for the treatment of soot particles, the implementation of that concept constitutes a large challenge for series operation in motor vehicles. In particular, soot particles are precipitated on the electrical insulation of the electrode and of the counter electrode leading to the exhaust gas line, in such a way that a layer of soot particles can bring about a short circuit.

SUMMARY OF THE INVENTION

It is accordingly an object of the invention to provide a device for treating exhaust gas containing soot particles, which overcomes the hereinafore-mentioned disadvantages and at least partially solves the highlighted problems of the heretofore-known devices of this general type. In particular, a device for treating exhaust gas containing soot particles is to be specified which prevents the formation of short circuits over electrical insulations.

With the foregoing and other objects in view there is provided, in accordance with the invention, a device for treating exhaust gas containing soot particles. The device comprises:

at least one ionization element for ionizing soot particles, at least one filter element having at least one section to which an electrical potential can be applied, and at least one flow-directing device which can influence a flow of the exhaust gas in such a way that depositing of the soot particles on at least the ionization element or an electrical insulation of the filter element, can be prevented or removed.

The device proposed herein may, in particular, be part of an exhaust gas system of a motor vehicle which has a diesel engine and is disposed, in particular, in an exhaust gas line of the exhaust gas system.

Accordingly, the exhaust gas containing soot particles flows through an ionization element which includes at least one electrode to which a high electrical voltage between 3 kV [kilovolts] and 50 kV, preferably between 5 kV and 25 kV, can be applied. The voltage is, in particular, set or adjusted or controlled in such a way that a corona discharge occurs between the electrode and a counter electrode. The ionization element may be formed as a simple discharge electrode or rod electrode, but it is preferred that the ionization element include a honeycomb body with a multiplicity of channels through which there can be a flow and at the inlet region or outlet region of which at least one electrode, which is oriented in the direction of flow or counter to the direction of flow, is disposed. The honeycomb body may, in particular, be at least partially, preferably completely, formed from an electrically conductive material, so that an electrical potential can be applied to the honeycomb body and therefore simultaneously to the electrodes.

The at least one ionization element can also preferably have an outer tube and an inner tube which is disposed concentrically with respect thereto, which tubes form an intermediate space through which the exhaust gas can flow, wherein at least one annular electrode with a multiplicity of electrode tips which project radially into the intermediate space is disposed on the inside of the outer tube.

The at least one filter element is preferably embodied as a surface precipitator which has a multiplicity of channels through which the exhaust gas can flow and which extend between an inlet region and an outlet region. As a result of the electrical potential which can be applied at least to one section of the filter element, the filter element can be used as a counter electrode to the electrode of the ionization element, and the soot particles which are deposited in the filter element can be neutralized.

The at least one filter element is particularly preferably a so-called open secondary flow filter in which there are no completely closed flow ducts. The filter element is instead shaped with a metallic nonwoven and metallic corrugations in which openings, directing structures, etc. are provided. The directing structures in this case form flow constructions in the flow passages, with the result that the dwell time and/or impact probability for soot particles in the interior of the filter element is increased. In this context, reference is made to the known patent publications by the Applicant of the instant application, which can be used for more detailed characterization of the filter element and/or regeneration thereof. In particular, incorporation by reference is made herein to the entire scope of the description of the following documents:

International Publication No. WO 01/80978, corresponding to U.S. Pat. No. 8,066,952;

International Publication No. WO 02/00326, corresponding to U.S. Pat. No. 6,712,884;

International Publication No. WO 2005/099867, corresponding to U.S. Pat. No. 7,959,868;

International Publication No. WO 2005/066469, corresponding to U.S. Patent Application Publication No. 2007/006556;

International Publication No. WO 2006/136431, corresponding to U.S. Patent Application Publication No. 2008/155967, and International Publication No. WO 2007/140932, corresponding to U.S. Pat. No. 8,066,787.

Such a filter element is preferably regenerated in this case continuously on the basis of the CRT method. For this purpose, for example, an oxidation catalytic converter in which nitrogen monoxide is (also) oxidized to nitrogen dioxide, which then reacts with the soot in the filter element, can be connected upstream of the device. In addition, it is also possible for such an oxidatively acting coating to be implemented in the filter element itself, either in a zone thereof or else in all of the regions of the filter element.

The at least one flow-directing device is disposed upstream of the at least one ionization element or of the at least one filter element in the flow direction of the exhaust gas. The flow-directing device includes elements which deflect at least one (spatially limited) portion of the exhaust gas, in particular by virtue of the fact that a portion of the exhaust gas at least partially flows around the flow-directing device, with the result that the deflection is influenced only by the shape of the flow-directing device. The deflection of the partial exhaust gas stream occurs in such a way that soot particles do not even reach either the ionization element (and in particular an electrical insulation of the ionization element) or the electrical insulation of the filter element, or impact thereon in such a way that the stream of exhaust gas acts there in such a way that agglomeration of the soot particles is not possible. Due to the avoidance of a layer of soot on the electrical insulation and/or the ionization element, the formation of a short circuit between the ionization element and/or the filter element with the exhaust gas line is also prevented.

In accordance with another feature of the invention, the flow-directing device preferably includes at least one element of the following group:

at least one flow rectifier, or at least one baffle.

A flow rectifier is understood herein to be a device which at least partially reduces the turbulence in a flow and/or laminarizes the stream of exhaust gas and therefore generates a more uniform speed distribution of the exhaust gas over the cross section of the exhaust gas line. This may occur, for example, by using a honeycomb body with a multiplicity of channels through which the exhaust gas can flow.

In accordance with a further particularly advantageous feature of the invention, the flow-directing device is adjustable. It is therefore possible, by adjusting the flow-directing device, to change the flow direction of a portion of the exhaust gas leaving the flow-directing device. In particular, after predefinable intervals or on the basis of vehicle parameters, the flow-directing device is adjusted in such a way that the exhaust gas flows alternately onto different regions of the ionization element or of the filter element, so that depositing of soot particles on the ionization element or the electrical insulation is prevented, or soot particles which have already been deposited are carried along and therefore eliminated.

In accordance with an added feature of the invention, in order to prevent depositing of the soot particles on the ionization element or the electrical insulation of the filter element, the flow-directing device advantageously forms a diameter (or cross section) through which exhaust gas can flow, which diameter (or cross section) is smaller, preferably at least 10% smaller, particularly preferably at least 25% smaller, than a diameter (or cross section) of the ionization element or filter element positioned downstream in the flow direction, through which diameter (or cross section) there can be a flow. In this way, the exhaust gas does not even reach the electrical insulation surrounding the ionization element or the filter element. The soot particles are therefore not deposited. In particular, in the event of deflection of the soot particles by the electrical field of the ionization element, the charged soot particles cannot reach the ionization element and/or the electrical insulation of the filter element.

In accordance with an additional feature of the invention, the at least one flow-directing device contains a catalytic reactor. In this way, the exhaust gas which flows past the flow-directing device can be catalytically converted.

In accordance with yet another feature of the invention, the at least one flow-directing device is attached directly to an exhaust gas line, with the result that further attachment elements for the flow-directing device can be dispensed with.

In accordance with yet a further feature of the invention, the at least one flow-directing device forms a flow shadow in the region of the electrical insulation, as a result of which depositing of the soot particles at least on the ionization element or the electrical insulation of the filter element is also prevented. The flow-directing device is therefore disposed in the stream of exhaust gas in such a way that the exhaust gas does not flow onto the ionization element or the electrical insulation of the filter element.

In accordance with yet an added feature of the invention, in order to prevent depositing of soot particles at least on the ionization element or the electrical insulation and to remove already deposited soot particles, it is also proposed that the at least one flow-directing device forms a concentrated inflow in the region of the electrical insulation with an increased exhaust gas speed. The exhaust gas speed is therefore increased compared to the average exhaust gas speed across the cross section of the exhaust gas line or the exhaust gas speed without the flow-directing device. This increase in the momentum of the exhaust gas ensures that already deposited particles are removed at least from the ionization element or the electrical insulation and particles located in the exhaust gas cannot be deposited.

In accordance with a concomitant preferred feature of the invention, the flow-directing device is disposed upstream of the ionization element, and the flow-directing device has a region through which there can be a flow, which region is dimensioned in such a way that ionized soot particles in the exhaust gas stream from an electrical field generated by the ionization element at least do not arrive at a surface of the ionization element or of the electrical insulation of the filter element. This embodiment is particularly preferably combined with an ionization element in which the outer tube and the inner tube which is disposed concentrically with respect thereto form an intermediate space through which the exhaust gas can flow, wherein at least one annular electrode with a multiplicity of electrode tips projecting radially into the intermediate space is disposed on the inside of the outer tube. This therefore means, in particular, that a flow obstacle is disposed so as to extend radially from at least the outer tube or the inner tube, the radial extent of which is selected as a function of a length of the electrical field of the ionization element in the flow direction, the strength of the electrical field and the exhaust gas speed in such a way that ionized soot particles during operation do not arrive at least at the surface of the ionization element or of the electrical insulations of the filter element. The main flow of the exhaust gas is therefore limited to a limited part of the intermediate space, wherein only a small stream of exhaust gas is formed at the walls of the ionization element.

Other features which are considered as characteristic for the invention are set forth in the appended claims, noting that the features specified individually in the claims can be combined with one another in any desired technically appropriate way, and disclose further refinements of the invention.

Although the invention is illustrated and described herein as embodied in a device for treating exhaust gas containing soot particles, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
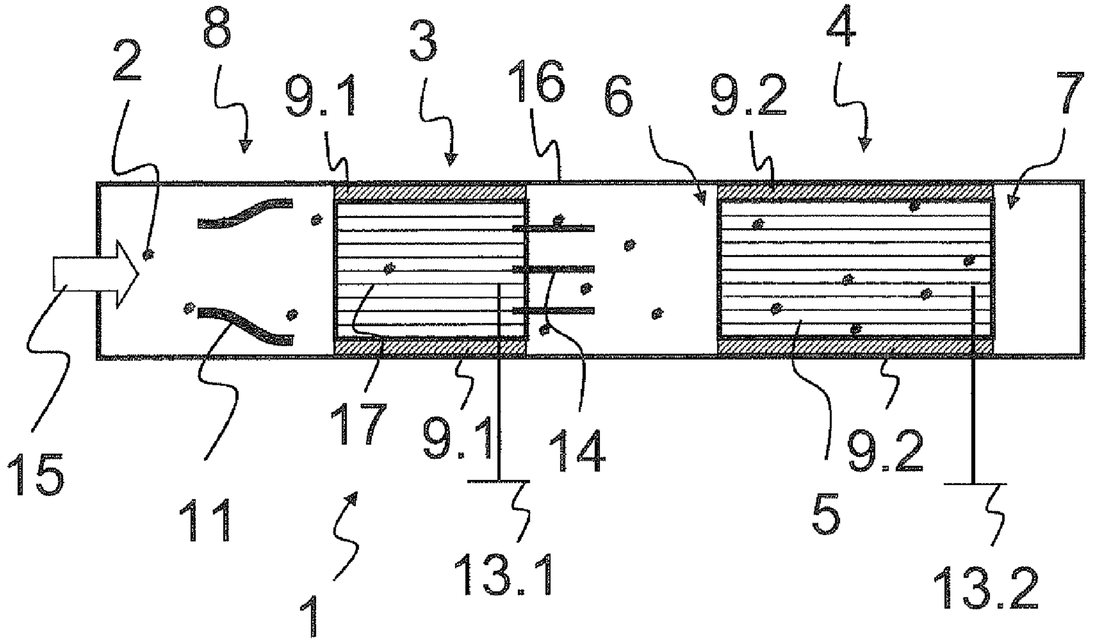
FIG. 1 is a diagrammatic, longitudinal-sectional view of an embodiment of a device according to the invention.

Referring now to the figures of the drawings in detail and first, particularly, to FIG. 1 thereof, there is seen a diagrammatic, longitudinal-sectional view of a device 1 according to the invention in an exhaust gas line 16. An ionization element 3 and a filter element 4 are disposed downstream of a flow-directing device 8 in a flow direction 15 of an exhaust gas containing soot particles 2. The flow-directing device 8 includes a baffle 11 which is attached to the exhaust gas line 16 by non-illustrated attachment elements. The ionization element 3 has an electrically conductive honeycomb body 17 which is connected to the exhaust gas line 16 by a first electrical insulation 9.1. A multiplicity of electrodes 14 is disposed on a rear side of the honeycomb body 17, as seen in the flow direction 15. An electrical voltage can be applied to the electrodes 14 through a first electrical terminal 13.1. The filter element 4 has a multiplicity of channels 5 through which the exhaust gas can flow. The channels extend between an inlet region 6 and an outlet region 7. The filter element 4 is insulated from the exhaust gas line 16 by a second electrical insulation 9.2. An electrical voltage can be applied to the filter element 4 through a second electrical terminal 13.2.

During operation, the exhaust gas containing soot particles 2 flows toward the ionization element 3 and in the process is at least partially deflected by the baffle 11. The baffle 11 accelerates a portion of the exhaust gas, which portion impacts on the first electrical insulation 9.1 with an increased speed, as a result of which the soot particles 2 cannot be deposited on the first electrical insulation 9.1 or particles which have already been deposited on the first electrical insulation 9.1 become detached again.

The exhaust gas flows further through the honeycomb body 17 of the ionization element 3, wherein the flow is at least partially laminarized. In a region between the electrodes 14 and the filter element 4, at least a portion of the soot particles 2 is ionized in a corona discharge between the electrodes 14 and the filter element 4. The charged soot particles 2 are accelerated toward the filter element 4, and are deposited therein with a relatively high deposition rate due to their charge.

Figure 2:
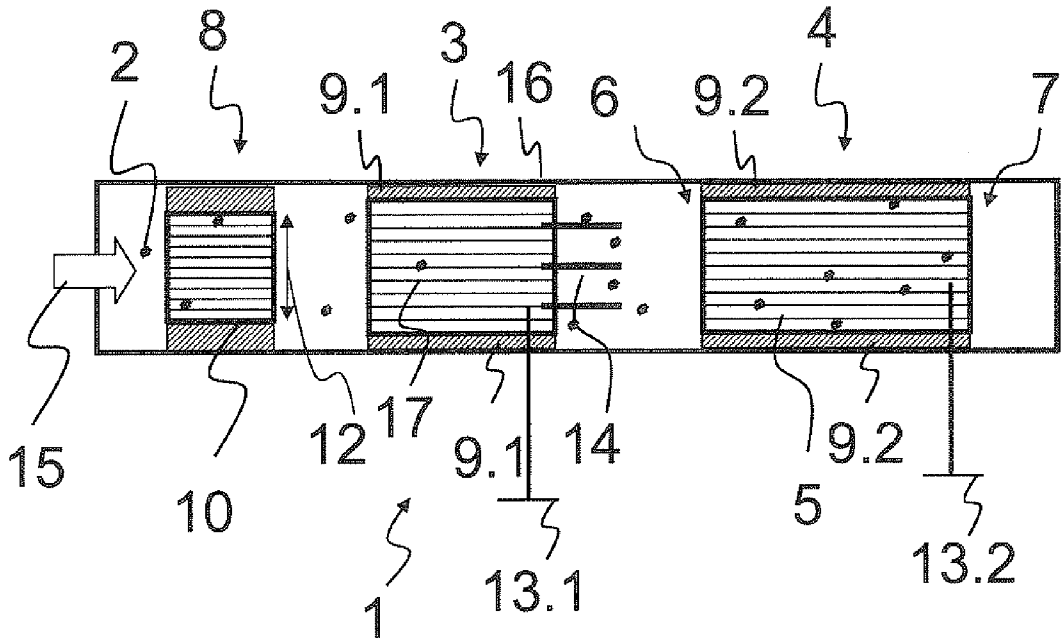
FIG. 2 is a longitudinal-sectional view of another embodiment of the device according to the invention.

FIG. 2 shows a diagrammatic, longitudinal-sectional view of another exemplary embodiment of the device 1 according to the invention. This exemplary embodiment of the device 1 according to the invention has a similar construction to the exemplary embodiment according to FIG. 1, so that reference is only made herein to the differences. In this exemplary embodiment, the flow-directing device 8 is embodied as a flow rectifier 10. The flow rectifier 10 has a diameter 12 through which a flow can occur. The diameter 12 is smaller than a diameter of the ionization element 3 positioned downstream, through which diameter a flow can also occur. In the flow rectifier 10, the exhaust gas stream is at least partially laminarized and reduced in its diameter to the diameter 12 of the flow rectifier 10, through which diameter the flow can occur. Therefore, given the sufficient difference between the diameter 12 of the flow rectifier and that of the ionization element 3, it is ensured that the soot particles 2 in the exhaust gas do not reach the first electrical insulations 9.1 of the ionization element 3. Deposition on the electrical insulations 9.1 is therefore avoided.

Figure 3:
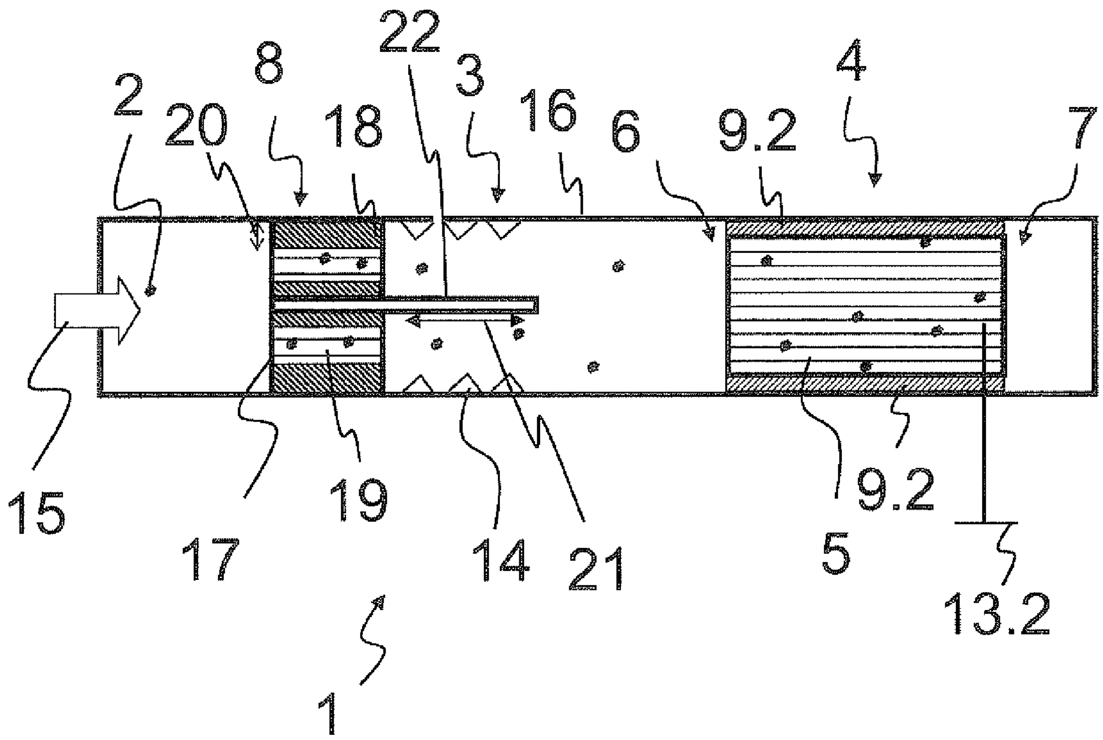
FIG. 3 is a longitudinal-sectional view of a further embodiment of the device according to the invention.

FIG. 3 shows a diagrammatic, longitudinal-sectional view of a further embodiment of the device 1 according to the invention, wherein in the text which follows details are given only regarding the differences thereof from the embodiment according to FIG. 2. The flow-directing device 8 has a honeycomb body 17 which holds a counter electrode 22 of the ionization element 3. The honeycomb body 17 has channels 18 which are closed in an outer region and an inner region and which prevent a flow through the honeycomb body 17 in these regions having a radial extent 20. A region 19 of the honeycomb body 17, through which a flow can occur is therefore formed. The ionization element 3 has an annular electrode 14 which is associated with the exhaust gas line 16 and has a multiplicity of electrode tips. The tubular counter electrode 22, which is held by the honeycomb body and, if appropriate, is insulated with respect thereto, is disposed centrally in the exhaust gas line 16. As a result, an electrical field can be formed between the annular electrode 14 and the tubular counter electrode 22, over a length 21.

The radial extent 20 of the closed channels 18 is selected in such a way that ionized soot particles 2 cannot be deflected by the electrical field present between the annular electrode 14 and the counter electrode 22 to such an extent that they can arrive at a surface of the ionization element 3. The magnitude of the radial extent 20 therefore depends substantially on the length 21, on the electrical field strength and on the exhaust gas speed.

The present invention effectively prevents soot particles from being deposited on an electrical insulation of exhaust gas purification components, as a result of which the formation of a short circuit is prevented. Reliable operation of the exhaust gas system is therefore ensured.

The invention claimed is:

1. A device for treating exhaust gas containing soot particles in an exhaust gas line, the device comprising:

at least one ionization element configured to ionize soot particles, said at least one ionization element having an electrical insulation;

at least one filter element disposed downstream of said at least one ionization element in an exhaust gas flow-direction, said at least one filter element having an electrical insulation and at least one section to which an electrical potential can be applied; and at least one flow-directing device disposed upstream of said at least one ionization element or said at least one filter element, said at least one flow-directing device configured to influence a flow of the exhaust gas to:

prevent or remove deposits of the soot particles on at least said electrical insulation of said at least one ionization element or said electrical insulation of said at least one filter element, prevent agglomeration of the soot particles, and prevent formation of a short circuit between at least one of said at least one ionization element or said at least one filter element and the exhaust gas line due to the soot particles.

2. The device according to claim 1, wherein said at least one flow-directing device includes at least one element selected from the group consisting of:

at least one flow rectifier, and at least one baffle.

3. The device according to claim 1, wherein said at least one flow-directing device is adjustable.

4. The device according to claim 1, wherein:

said at least one ionization element has a diameter through which exhaust gas can flow;

said at least one filter element has a diameter through which exhaust gas can flow; and said at least one flow-directing device is disposed upstream of said at least one ionization element and said at least one filter element in an exhaust gas flow-direction and has a diameter through which exhaust gas can flow being smaller than said diameters of said at least one ionization element or said at least one filter element.

5. The device according to claim 1, wherein said at least one flow-directing device contains a catalytic reactor.

6. The device according to claim 1, wherein said at least one flow-directing device is attached to an exhaust gas line.

7. The device according to claim 1, wherein said at least one flow-directing device forms a flow shadow in vicinity of said electrical insulation.

8. The device according to claim 1, wherein said at least one flow-directing device forms a concentrated inflow with an increased exhaust gas speed in vicinity of at least one surface of said at least one ionization element or of said electrical insulation.

9. The device according to claim 1, wherein:

said at least one ionization element generates a field;

said at least one flow-directing device is disposed upstream of said at least one ionization element;

said at least one flow-directing device has a region through which an exhaust gas flow can occur; and said region is dimensioned to prevent ionized soot particles in the exhaust gas flow from said field from arriving at a surface of said at least one ionization element or of said electrical insulation.

* * * * *